(12) United States Patent
Hamilton, II et al.

(10) Patent No.: US 8,271,475 B2
(45) Date of Patent: Sep. 18, 2012

(54) APPLICATION OF USER CONTEXT TO SEARCHES IN A VIRTUAL UNIVERSE

(75) Inventors: Rick A. Hamilton, II, Charlottesville, VA (US); Neal M. Keller, Pleasantville, NY (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/127,174

(22) Filed: May 27, 2008

(65) Prior Publication Data

US 2009/0299988 A1 Dec. 3, 2009

(51) Int. Cl.
G06F 7/00 (2006.01)
G06F 17/30 (2006.01)
(52) U.S. Cl. ......................................... 707/710; 715/706
(58) Field of Classification Search .................... None
See application file for complete search history.

(56) References Cited

U.S. PATENT DOCUMENTS

| | | | |
|---|---|---|---|
| 5,736,982 A * | 4/1998 | Suzuki et al. ................. | 715/706 |
| 5,737,533 A * | 4/1998 | de Hond ........................ | 709/219 |
| 6,643,639 B2 | 11/2003 | Biebesheimer et al. | |
| 6,693,651 B2 | 2/2004 | Biebesheimer et al. | |
| 6,701,311 B2 | 3/2004 | Biebesheimer et al. | |
| 6,778,193 B2 | 8/2004 | Biebesheimer et al. | |
| 6,785,676 B2 | 8/2004 | Oblinger | |
| 6,853,998 B2 | 2/2005 | Biebesheimer et al. | |
| 6,873,990 B2 | 3/2005 | Oblinger | |
| 7,468,729 B1 * | 12/2008 | Levinson ....................... | 345/473 |
| 2002/0107842 A1 * | 8/2002 | Biebesheimer et al. .......... | 707/3 |
| 2004/0024846 A1 * | 2/2004 | Randall et al. ................ | 709/219 |
| 2004/0075677 A1 * | 4/2004 | Loyall et al. .................. | 345/706 |
| 2005/0125229 A1 * | 6/2005 | Kurzweil ...................... | 704/270 |
| 2005/0143108 A1 * | 6/2005 | Seo et al. ....................... | 455/466 |
| 2005/0216346 A1 * | 9/2005 | Kusumoto et al. ............. | 705/14 |
| 2006/0031578 A1 * | 2/2006 | Pelletier ........................ | 709/245 |
| 2008/0091692 A1 * | 4/2008 | Keith et al. .................... | 707/100 |
| 2008/0183678 A1 * | 7/2008 | Weston et al. .................... | 707/3 |
| 2008/0195699 A1 * | 8/2008 | Min et al. ....................... | 709/203 |
| 2008/0201321 A1 * | 8/2008 | Fitzpatrick et al. ............... | 707/5 |
| 2008/0249987 A1 * | 10/2008 | Ogasawara ....................... | 707/3 |
| 2008/0250001 A1 * | 10/2008 | Onda et al. ........................ | 707/4 |
| 2008/0262911 A1 * | 10/2008 | Altberg et al. .................. | 705/14 |

(Continued)

OTHER PUBLICATIONS

Avatar Semantic Search: A database approach to information retrieval, Kandogan et al, SIGMOD 2006, Jun. 27-29, 2006.*

(Continued)

*Primary Examiner* — Pierre Vital
*Assistant Examiner* — Augustine K Obisesan
(74) *Attorney, Agent, or Firm* — Hoffman Warnick LLC; William E. Schiesser

(57) ABSTRACT

An approach that applies user context to searches in a virtual universe is described. In one embodiment, there is an enhanced virtual universe search tool that includes a receiving component configured to receive a query from an avatar that is online in the virtual universe. A scanning component is configured to scan a collection of avatar data describing attributes that are relevant to behavioral, search and informational needs of the avatar. A resource search component is configured to return search results for the query that are in accordance with the scanned collection of avatar data.

13 Claims, 6 Drawing Sheets

U.S. PATENT DOCUMENTS

| | | | |
|---|---|---|---|
| 2008/0263446 A1* | 10/2008 | Altberg et al. | 715/706 |
| 2008/0301112 A1* | 12/2008 | Wu | 707/5 |
| 2009/0099925 A1* | 4/2009 | Mehta et al. | 705/14 |
| 2009/0144211 A1* | 6/2009 | O'Sullivan et al. | 706/14 |
| 2009/0158161 A1* | 6/2009 | Gibbs et al. | 715/733 |
| 2009/0158170 A1 | 6/2009 | Narayanan et al. | |
| 2009/0210301 A1* | 8/2009 | Porter et al. | 705/14 |
| 2009/0299960 A1* | 12/2009 | Lineberger | 707/3 |

OTHER PUBLICATIONS

Dynamic Player Modelling: A framework for player-centered digital games, Darryl et al., School of computing and information engineering, University of Ulster, Northern Ireland, Nov. 7, 2004.*

Learning and managing user context in personalized communication services, Dinoff et al, AVI'06 May 23, 2006, Venice Italy.*

Real time user context modeling for information retrieval agents, Bauer et al, CIKM'01 Atalnta, Georgia, USA.*

Social interaction between robots, avatars & humans, Dragone et al, IEEE 2005.*

Machine learning-based intelligent recommendation in virtual mall, Hong-Wei et al, IEEE 2004.*

Precomputing avatar behavior from human motion data, Lee et al, Graphical Models vol. 68 pp. 158-174, 2006.*

Navigation by query in virtual worlds, Ballegooij et al, ACM 2001.*

Muhebbullah, Office Action Communication for U.S. Appl. No. 12/127,164, dated Jun. 23, 2011, 19 pages.

Muhebbullah, Office Action Communication for U.S. Appl. No. 12/127,164, dated Nov. 25, 2011, 10 pages.

* cited by examiner

APPLICATION OF USER CONTEXT TO SEARCHES IN A VIRTUAL UNIVERSE

CROSS REFERENCE TO RELATED APPLICATIONS

This patent application relates to commonly-assigned U.S. patent application Ser. No. 12/127,164, entitled "EXPLICIT USE OF USER CONTEXT OBJECTS IN A VIRTUAL UNIVERSE", and filed concurrently with this application.

FIELD OF THE INVENTION

This invention relates generally to virtual universes, and more specifically to providing enhanced search capabilities in a virtual universe that take into account user contexts of avatars that reside in the virtual universe.

BACKGROUND OF THE INVENTION

Virtual universes or virtual worlds are computer-based simulated environments intended for its users to inhabit and interact via avatars, which are personas or representations of the users of the virtual universes and generally take the form of two-dimensional or three-dimensional human or fantastical representations of a person's self. One well known virtual universe is Second Life which is a trademark of Linden Research in the United States, other countries or both. Avatars in these types of virtual universes participate in a wide range of business and social experiences with other avatars and resources such as landmarks, events, retail stores, services, etc.

As the number of avatars and resources proliferate in virtual universes, users of these universes will increasingly rely on search and retrieval systems to discover relevant resources for facilitating these business and social experiences. Typical virtual universes use simple search and retrieval systems to perform straightforward text searches. Search and retrieval systems that employ simple text searches often do not provide the most relevant results. In order to obtain better results, users will often have to supply additional information to enhance the search. This is frustrating to users because they typically have limited time, patience, ability and interest to provide this information. Because it is frustrating for users to obtain information on resources available in virtual universes through currently available search and retrieval systems, users will often attempt to obtain such information from other users through their avatars. However, this is not a suitable option because often times other avatars are not aware of all resources that could be the subject of an inquiry or if they do have some knowledge then it comes at cost with regard to time and quantity at which information is conveyed to the interested avatar. Thus, current approaches to discovering relevant resources in a virtual universe are not suited to enhancing business and social experiences of avatars.

SUMMARY OF THE INVENTION

In one embodiment, there is a method for performing a search for a resource in a virtual universe using user context. In this embodiment, the method comprises: receiving a query from an avatar that is online in the virtual universe; scanning a collection of avatar data describing attributes that are relevant to behavioral, search and informational needs of the avatar; and performing a resource search for the query in accordance with the scanned collection of avatar data.

In a second embodiment, there is a computer system for automatically performing a resource search in a virtual universe using user context. In this embodiment, the system comprises at least one processing unit and memory operably associated with the at least one processing unit. An enhanced virtual universe search tool is storable in memory and executable by the at least one processing unit. The tool comprises a receiving component configured to receive a query from an avatar that is online in the virtual universe. A scanning component is configured to scan a collection of avatar data describing attributes that are relevant to behavioral, search and informational needs of the avatar. A resource search component is configured to return search results for the query that are in accordance with the scanned collection of avatar data.

In a third embodiment, there is a computer-readable medium storing computer instructions, which when executed, enables a computer system to perform a search for a resource in a virtual universe using user context. In this embodiment, the computer instructions comprises receiving a query from an avatar that is online in the virtual universe; scanning a collection of avatar data describing attributes that are relevant to behavioral, search and informational needs of the avatar; and performing a resource search for the query in accordance with the scanned collection of avatar data.

In a fourth embodiment, there is a method for providing an enhanced virtual universe search tool as a service within a virtual universe for facilitating user context type searches for resources within the virtual universe. In this embodiment, the method comprises deploying the enhanced virtual universe search tool in a computer system as a service that is in communication with the virtual universe. The enhanced virtual universe search tool is operable to: receive a query from an avatar that is online in the virtual universe; scan a collection of avatar data describing attributes that are relevant to behavioral, search and informational needs of the avatar; and perform a resource search for the query in accordance with the scanned collection of avatar data as a service.

In a fifth embodiment, there is a method for deploying an enhanced virtual universe search tool for use in a computer system that automatically performs a search for a resource in a virtual universe using user context. In this embodiment, a computer infrastructure is provided and is operable to receive a query from an avatar that is online in the virtual universe; scan a collection of avatar data describing attributes that are relevant to behavioral, search and informational needs of the avatar; and perform a resource search for the query in accordance with the scanned collection of avatar data.

DETAILED DESCRIPTION OF THE INVENTION

Embodiments of this invention are directed to a technique for providing enhanced search capabilities in a virtual universe that take into account user contexts of avatars that reside in the virtual universe. The embodiments of this invention use in-world (virtual world) actions of avatars and their possessions (e.g., items stored in their inventory) to formulate a context that is applied when an avatar generates a search request. In addition to virtual world actions and possessions, knowledge obtained from the user of the avatar in the real world can be used to formulate a context for searches. Upon receiving a query from an avatar that is online in the virtual universe, embodiments of this invention scan a collection of avatar data describing attributes that are relevant to behavioral, search and informational needs of the avatar. The collection of avatar information includes inventory items belonging to the avatar, teleportation history of the avatar, motion history of the avatar and/or social tagging behavior exhibited by the user of the avatar in the real world. A user context is consequently identified from the scanned collection of avatar data and used to perform a resource search for the query in accordance with the scanned collection of avatar data. In one embodiment of this invention, machine learning techniques (e.g., unsupervised and supervised machine learning) are used to determine a user context for the avatar from past behavior in the virtual universe and/or past behavior exhibited by the user of the avatar in the real world. This user context can also be modified based on future queries submitted by the avatar. The user context that is determined from these machine learning techniques is then used to perform a resource search for the query submitted by the avatar.

Figure 1:
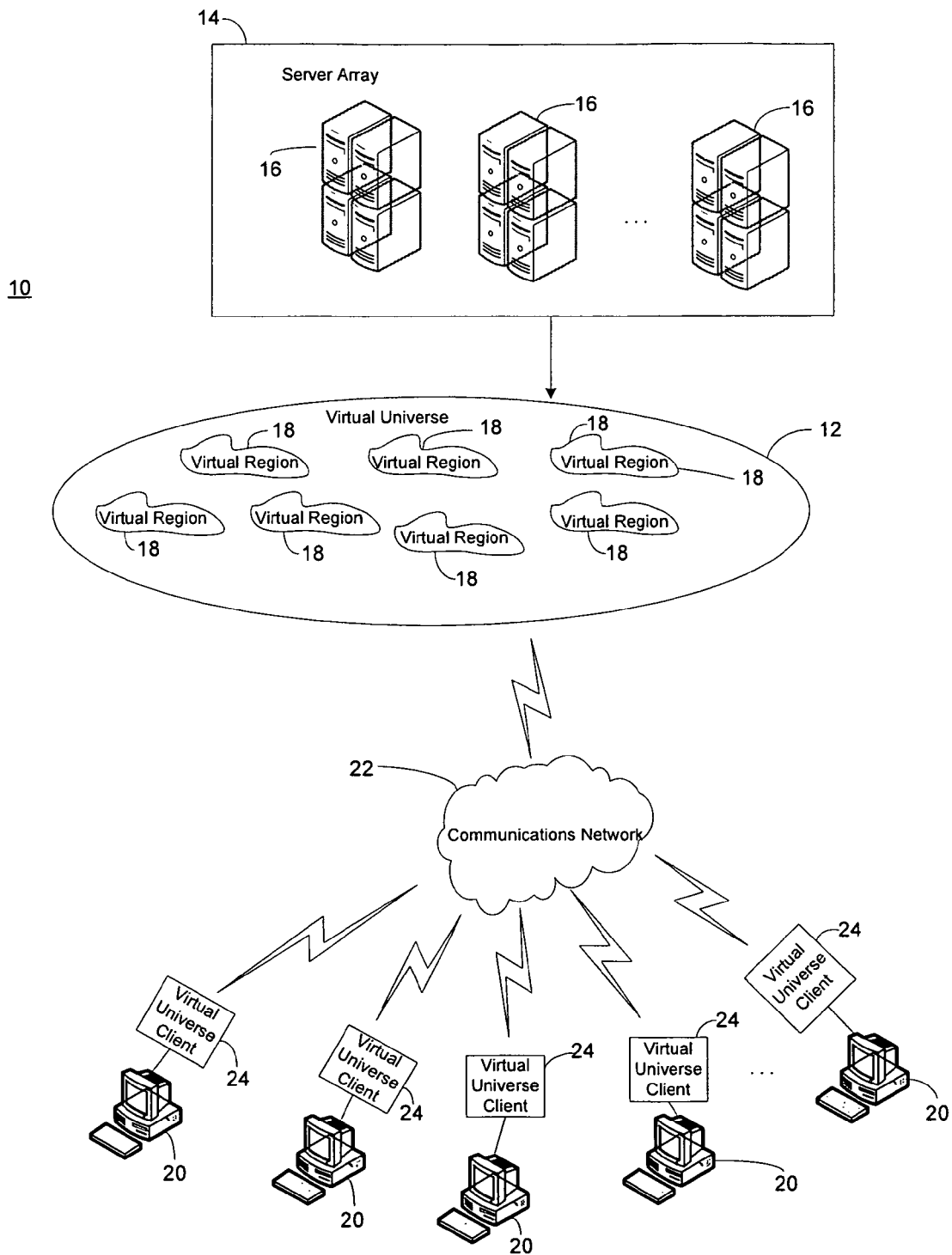
FIG. 1 shows a high-level schematic diagram showing a networking environment for providing a virtual universe according to one embodiment of this invention.

FIG. 1 shows a high-level schematic diagram showing a networking environment 10 for providing a virtual universe 12 according to one embodiment of this invention in which a search service can be used that takes into account user contexts of avatars entering the search. As shown in FIG. 1, the networking environment 10 comprises a server array or grid 14 comprising a plurality of servers 16 each responsible for managing a sliver of virtual real estate within the virtual universe 12. A virtual universe can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe. FIG. 1 also shows that users operating computers 20 interact with the virtual universe 12 through a communication network 22 via a virtual universe client 24 that resides in the computer. Below are further details of the virtual universe 12, server array 14, and virtual universe client 24.

Figure 2:
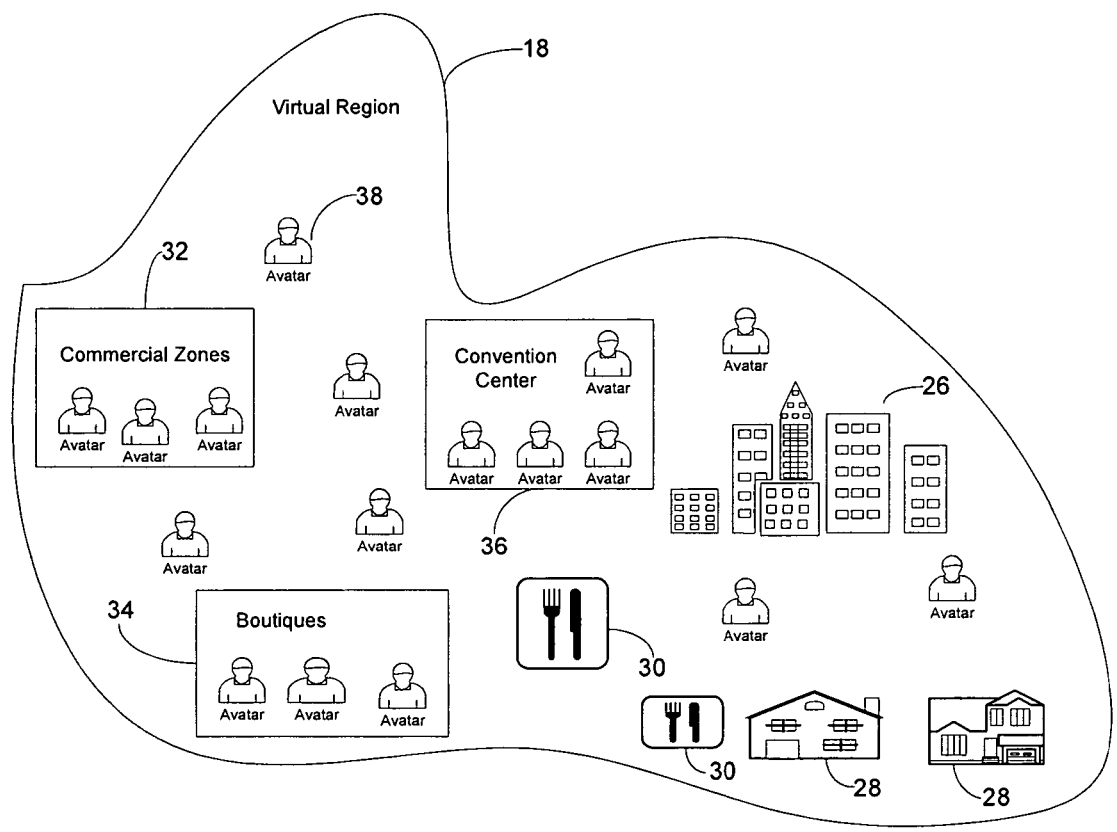
FIG. 2 shows a more detailed view of a virtual region shown in the virtual universe of FIG. 1.

FIG. 2 shows a more detailed view of what one virtual region 18 shown in the virtual universe 12 of FIG. 1 may comprise. As an example, the virtual region 18 shown in FIG. 2 comprises a downtown office center 26, homes 28, restaurants 30, commercial zones 32 and boutiques 34 for shopping and a convention center 36 for meetings and various conventions. Residents or avatars 38, which as mentioned above, are personas or representations of the users of the virtual universe, roam all about the virtual region by walking, driving, flying or even by teleportation or transportation which is essentially moving through space from one point to another, more or less instantaneously. These examples of items in the virtual region 18 shown in FIG. 2 are only illustrative of some things that may be found in a virtual region and those skilled in the art will recognize that these regions can have many more items that can be found in a real-life universe as well as things that do not presently exist in real life.

As the number of avatars and resources proliferate within these virtual regions 18, users will want to know where to buy certain goods and services, where to go for entertainment and generally to know what is happening. It is believed that simple search and retrieval systems that perform straightforward text searches will not be an adequate tool for enabling users to quickly and efficiently find out information that is suited particularly for them. By generating a search that takes into account user context derived from past behavior in the virtual world and real world as provided in this invention, the user is able to receive faster and more relevant responses to search queries without the need to complete extensive profiles or to otherwise explicitly provide user context information. In addition, the user context search provided by this invention further benefits virtual universe grid owners (e.g., providers of virtual universes) because less system resources are required to search using robust user context information, presuming that resources are available to create and update the user contexts, and associated attributes and values, as background/batch processes, based on recent user behavior in the virtual universe and real life. Below are further details on the user context search services provided in this invention.

Figure 3:
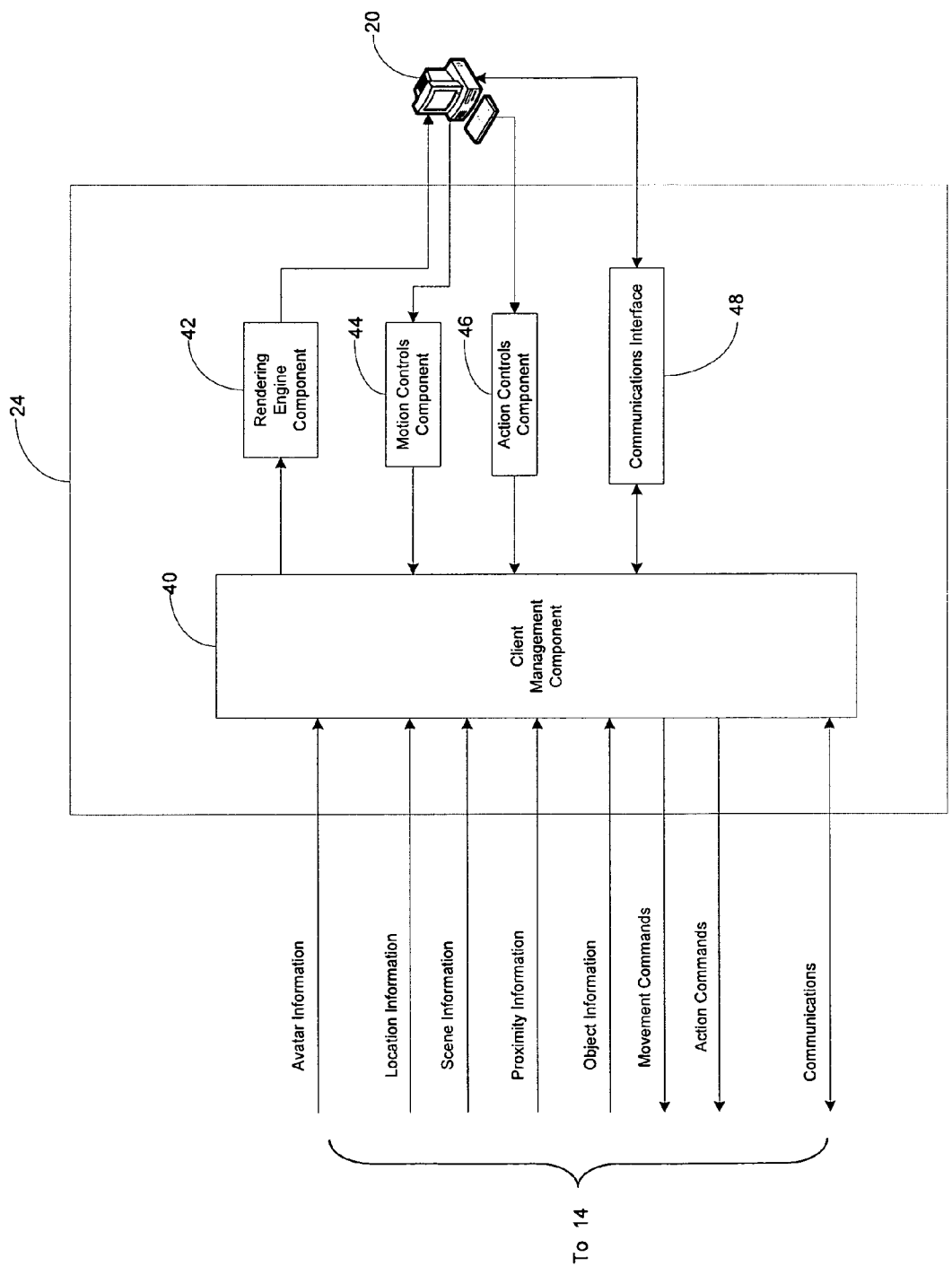
FIG. 3 shows a more detailed view of the virtual universe client shown in FIG. 1.

FIG. 3 shows a more detailed view of the virtual universe client 24 shown in FIG. 1. The virtual universe client 24, which enables users to interact with the virtual universe 12, comprises a client management component 40, which manages actions, movements and communications made by a user through computer 20, and information received from the virtual universe through the server array 14. A rendering engine component 42 enables the user of the computer 20 to visualize his or her avatar within the surroundings of the particular region of the virtual universe 12 that it is presently located. A motion controls component 44 enables the user to make movements through the virtual universe. In one embodiment, movements through the virtual universe can include for example, gestures, postures, walking, running, driving, flying, etc. An action controls component 46 enables the user to perform actions in the virtual universe such as buying items for his or her avatar or even for their real-life selves, building homes, planting gardens, etc., as well as changing the appearance of their avatar. These actions are only illustrative of some possible actions that a user can perform in the virtual universe and are not limiting of the many possible actions that can be performed. A communications interface 48 enables a user to communicate with other users of the virtual universe 12 through modalities such as chatting, instant messaging, gesturing, talking and electronic mail (e-mail).

FIG. 3 shows the various types of information received by the client management component 40 from the virtual universe through the server array 14. In particular, the client management component 40 receives avatar information about the avatars that are in proximity to the user's avatar. In addition, the client management component 40 receives location information about the area that the user's avatar is near (e.g., what region or island he or she is in) as well as scene information (e.g., what the avatar sees). The client management component 40 also receives proximity information which contains information on what the user's avatar is near and object information which is information that can be obtained by one's senses (e.g., touch, taste, smell, etc.,) and what actions are possible for nearby objects (e.g., postures, movements, etc.). FIG. 3 also shows the movement commands and action commands that are generated by the user are sent to the server array via the client management component 40, as well as the communications that can be sent to the users of other avatars within the virtual universe.

Figure 4:
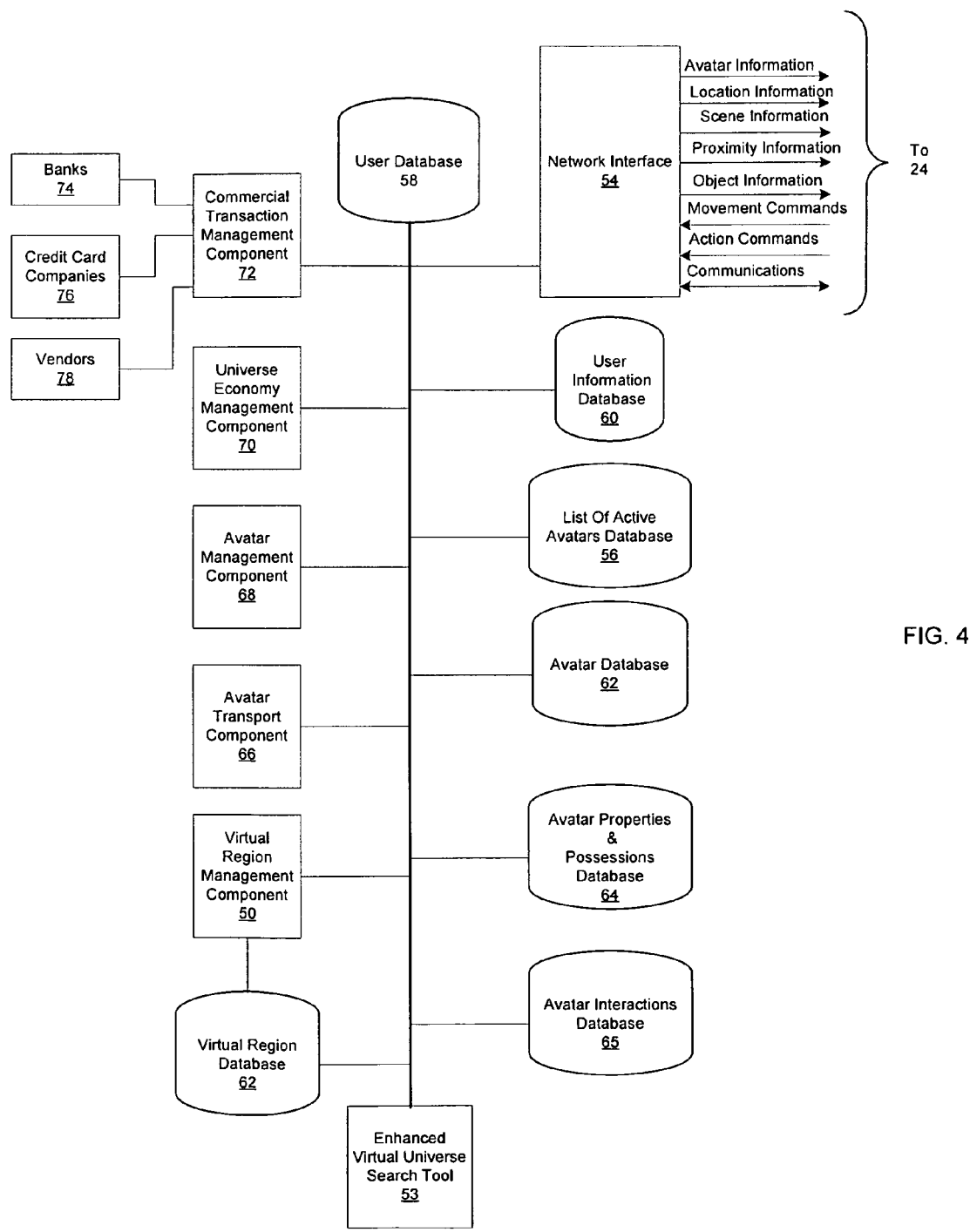
FIG. 4 shows a more detailed view of some the functionalities provided by the server array shown in FIG. 1.

FIG. 4 shows a more detailed view of some the functionalities provided by the server array 14 shown in FIG. 1. In particular, FIG. 4 shows a virtual region management component 50 that manages a virtual region within the virtual universe. In particular, the virtual region management component 50 manages what happens in a particular region such as the type of landscape in that region, the amount of homes, commercial zones, boutiques, streets, parks, restaurants, etc. For example, the virtual region management component 50 would allow the owner of a particular region or establishment within the region to specify requirements for entering or remaining within the region that could potentially affect certain avatar characteristics. In addition, the virtual region management component 50 would allow the owner of a particular region or establishment to provide a textual description that describes the area in more detail so that the avatars can ascertain if there will be a potential effect on their use of specific inventory items within that region. Those skilled in the art will recognize that the virtual region management component 50 can manage many other facets within the virtual region.

A virtual region database 52 stores information on all of the specifics in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular island within the virtual region 18.

An enhanced virtual universe search tool 53 allows avatars of the virtual universe 12 through their users to perform searches that provide a user context to submitted queries that is derived from past behavior in the virtual world and real world. In operation, the enhanced virtual universe search tool 53 receives a query from an avatar and scans a collection of avatar data describing attributes that are relevant to behavioral, search and informational needs of the avatar. In particular, the enhanced virtual universe search tool 53 scans inventory items belonging to the avatar, teleportation history of the avatar, motion history of the avatar and/or social tagging behavior exhibited by the user of the avatar in the real world and identifies a user context for the query. The query is then reformulated to take into account the user context and the search is then run. In another embodiment, the enhanced virtual universe search tool 53 utilizes machine learning techniques to determine a user context for the avatar from past behavior in the virtual universe and/or past behavior exhibited by the user of the avatar in the real world. Below is a more detailed discussion of the enhanced virtual universe search tool 53 and how it performs some of the above-mentioned functions.

FIG. 4 shows a network interface 54 that enables the server array 14 to interact with the virtual universe client 24 residing on computer 20. In particular, the network interface 54 communicates avatar, location, scene, proximity and object information to the user through the virtual universe client 24 and receives movement and action commands as well as communications from the user via the universe client.

As shown in FIG. 4, there are several different databases for storing information. In particular, database 56 contains a list of all the avatars that are online in the virtual universe 12. Databases 58 and 60 contain information on the actual human users of the virtual universe 12. In one embodiment, database 58 contains general information on the users such as names, addresses, interests, ages, etc., while database 60 contains more private information on the users such as email addresses, billing information (e.g., credit card information) for taking part in transactions. Databases 62 and 64 contain information on the avatars of the users that reside in the virtual universe 12. In one embodiment, database 62 contains information such as all of the avatars that a user may have, the profile of each avatar, avatar characteristics (e.g., appearance, voice and movement features) while database 64 contains an inventory listing properties and possessions that each avatar owns such as hair pieces, weapons, jewelry, houses, cars, sporting equipment, appearance, attire, etc. Avatar interactions database 65 contains general interaction information by avatars such as the number and nature of their type of teleports within the virtual universe 12, patterns of movement within the virtual universe that are indicative of how adept avatars are with regard to moving and navigating about the universe 12, eating preferences at restaurants in the virtual universe, recreational preferences, etc. Those skilled in the art will recognize that databases 58-65 may contain additional information if desired. Although the above information is shown in FIG. 4 as being stored in databases, those skilled in the art will recognize that other means of storing information can be utilized.

An avatar transport component 66 enables users to transport, which as mentioned above, allows avatars to transport through space from one point to another point, instantaneously. As a result, an avatar could for example travel from a business region to an entertainment region to hear a concert.

An avatar management component 68 keeps track of what online avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc. In one embodiment of the invention, avatar activities such as specific shopping and eating behaviors are stored in the avatar interactions database 65.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. The avatar could make a purchase of a service using the virtual universe currency. In some instances, the user may want to take part in a commercial transaction that benefits him or her and not their avatar. In this case, a commercial transaction management component 72 allows the user to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78.

Although not expressly shown in FIG. 4, all of the components shown in the figure are configured to interact with each other. The components that are shown as being interconnected are illustrated in that manner to convey the close interactions that exist between these components such as the banks 74, credit card companies 76, and vendors with the commercial transaction management component 72.

Figure 5:
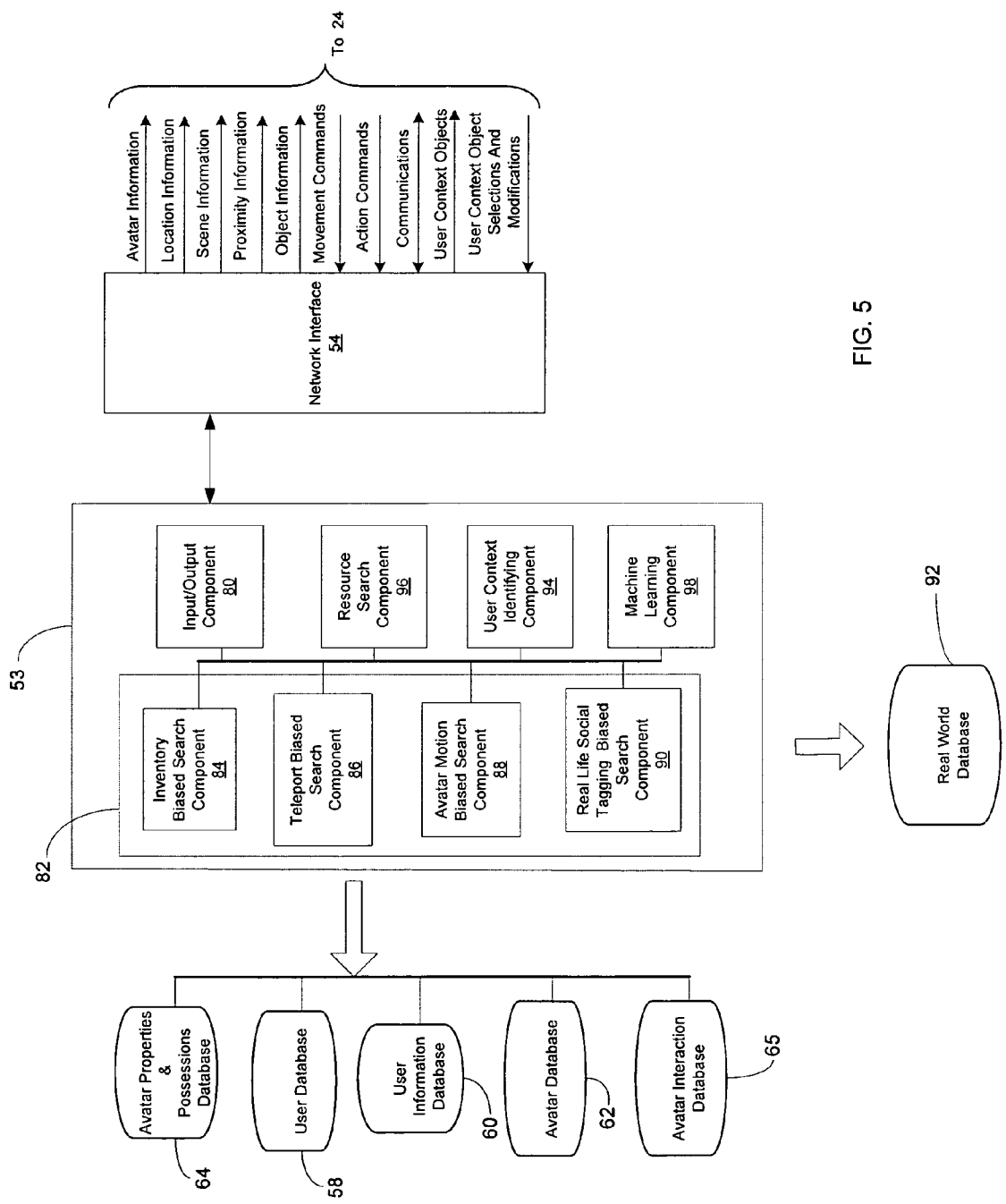
FIG. 5 shows an enhanced virtual universe search tool according to one embodiment of this invention that operates in the environment shown in FIG. 1.

FIG. 5 shows a more detailed view of the enhanced virtual universe search tool 53 according to one embodiment of this invention that operates in the environment of FIG. 1. As shown in FIG. 5, in this embodiment, the enhanced virtual universe search tool 53 resides on the same computer system as the server 14 and communicates directly to the virtual universe and its residents via the virtual universe client 24. In other embodiments, the enhanced virtual universe search tool 53 might reside on the same computers as the virtual universe client 24, or reside on separate computers in direct communication with the virtual universe servers 16 and virtual universe clients 24. For example, the search tool might reside on separate computers provided by a third party as a service to the virtual universe provider or the avatar of an individual user.

Referring back to FIG. 5, the enhanced virtual universe search tool 53 includes an input/output component 80 that is configured to receive input and generate output to the virtual universe client 24 via the network interface 54. In particular, the input/output component 80 receives queries for searches within the virtual universe 12 from users via the virtual universe client 24 and returns the results of the search to the users via the client. The enhanced virtual universe search tool 53 further includes a scanning component 82 configured to scan a collection of avatar data describing attributes that are relevant to behavioral, search and informational needs of the avatar (i.e., the user) making the query.

As shown in FIG. 5, the scanning component 82 includes an inventory biased search component 84, a teleport biased search component 86, an avatar motion biased search component 88 and a real life social tagging biased search component 90. The inventory biased search component 84 is configured to search inventory items belonging to the avatar that are stored in the avatar properties and possessions database 64. The teleport biased search component 86 is configured to search teleportation history of the avatar that is stored in the avatar interaction database 65. The avatar motion biased search component 88 is configured to search motion history of the avatar that is also stored in the avatar interaction database 65. The real life social tagging biased search component 90 is configured to search social tagging behavior exhibited by the user of the avatar in the real world. FIG. 5 shows the social tagging behavior exhibited by users of the virtual universe 12 stored in a real world database 92, however, those skilled in the art will recognize that this behavior may be stored in a multitude of databases or repositories that tag behavior of users throughout the real world and even virtual worlds outside of the virtual universe 12. Well-known data acquisition techniques can be used by the real life social tagging biased search component 90 to access this type of information from a wide variety of different databases. As shown in FIG. 5, the inventory biased search component 84, teleport biased search component 86, avatar motion biased search component 88 and real life social tagging biased search component 90 also have access to user database 58, user information database 60 and avatar database 62 if it is desired to have such information.

A user context identifying component 94 is configured to identify a user context from the collection of avatar data scanned by the scanning component 82. In one embodiment, the user context identifying component 94 is able to use matching techniques to assign mutually exclusive category designations to avatar data in each particular dimension. In particular, for each dimension of avatar data from databases 58-65, user context identifying component 94 compares the specific avatar's data to a list of category designations with associated criteria. For example, the history of an avatar's motions (frequency of jitter and irregular movements and subsequent corrections to efficiently arrive at a destination) is compared with criteria associated with a list of category designations (virtual universe "expert", virtual universe "competent", virtual universe "challenged", etc.) to identify a value (for example virtual universe "challenged") associated with an attribute "mobility".

A resource search component 96 is configured to reformulate the query to take into account the user context identified for the avatar by the user context identifying component 94. The resource search component 96 then searches databases 58-65, real world database 92, or any other database within the server array 14 and returns search results for the query to the user via the input/output component 80.

As an example, consider that the enhanced virtual universe search tool 53 receives a query for the word "church" from a user. If the user's avatar has rosary beads in its inventory as noted in the avatar properties and possessions database 64, then the inventory bias search component 84 will note this item to the user context identifying component 94. The user context identifying component 94 identifies the rosary beads as being associated with the Roman Catholic religion via a look up table, assigns the value "Roman Catholic" to this particular user's attribute "Religion", and then biases or optimizes the search to display Roman Catholic virtual universe churches. The resource search component 96 then returns results of the Roman Catholic virtual universe churches to the user via the input/output component 80 and the virtual universe client 24. Similarly, if the inventory of the avatar contained a Max Lucado book instead of the rosary beads, then the enhanced virtual universe search tool 53 would bias the search to list Protestant virtual universe churches.

In another example, consider that the enhanced virtual universe search tool 53 receives a query for the word "parks" from a user. If the enhanced virtual universe search tool 53 scans the avatar interaction database 65 with the avatar motion biased search component 88 and determines from the history of motions that the avatar has exhibited significant patterns of unease in motion (e.g., jitter, back and forth movement, klutziness, etc.), then the user context identifying component 94 identifies the avatar as a newcomer to the virtual universe (for user context attribute "mobility" it assigns the value "challenged") and then biases the search to display only those parks that have simple terrain structures and no bridges and steps that are difficult to traverse, using any of a number of publicly disclosed mechanisms by which objects can be assigned attribute values based on textual descriptions. The resource search component 96 then returns results of these types of parks to the user via the input/output component 80 and the virtual universe client 24. In one embodiment, the user context attributes and identified associated values (the attribute-value pairs) for each avatar in each dimension can be stored the avatar interaction database 65.

In an example of where the enhanced virtual universe search tool 53 uses teleport history to provide user context to a query such as "parks", the teleport biased search component 86 could scan the avatar interaction database 65 and determine from the history of teleports that the avatar has twice teleported to parks that have water fountains. The user context identifying component 94 then identifies the avatar as having an interest in parks that have fountains and biases the search to display only those parks that have water fountains.

Before describing an example of where the enhanced virtual universe search tool 53 uses the real life social tagging biased search component 90 to provide user context to a query, it is preferable to provide some understanding of real life social tagging. As used herein, real life social tagging involves using open ended labels called tags to categorize and retrieve Web pages, photographs, Web links and other Web content. The process of tagging makes a body of information easier to search, discover and navigate over time. A well-developed tag is ideally accessible as a shared vocabulary that is both originated by, and familiar to, its primary users. These tags may be transferred to the virtual universe 12 to the real life social tagging biased search component 90 manually, by a third-party service, or by a simple interface in which the search component 90 reads such tags stored on the Web, in cookies, or in other locations on the user's storage. These approaches serve to make a "search" made by the real life social tagging biased search component 90 more effective and relevant to an avatar in the virtual universe 12.

In an example of where the enhanced virtual universe search tool 53 uses real life social tagging to provide user context to a query such as "parks", the real life social tagging biased search component 90 scans the real world database 92 and can determine from the history of social tagging that the avatar has twice visited parks that have statutes from Rodin and Vigeland as evidenced by photos stored in a commercially available web hosting site. The user context identifying component 94 can then identify the avatar as having an interest in parks that have statues of human subjects and then biases the search to display only those parks that have statues.

For the ease of illustration, the above examples are presented to describe how the inventory biased search component 84, teleport biased search component 86, avatar motion biased search component 88 and the real life social tagging biased search component 90 could be used individually to determine user contexts. Those skilled in the art will recognize that the scanning component 82 can use any combination of the inventory biased search component 84, teleport biased search component 86, avatar motion biased search component 88 and the real life social tagging biased search component 90 in combination to identify a user context for a query transmitted by an avatar.

In another embodiment of this invention, the enhanced virtual universe search tool 53 is configured to use a machine learning component 98 to determine a user context for the query generated by the avatar. In this embodiment, the machine learning component 98 uses past behavior in the virtual universe or past behavior exhibited by the user of the avatar in the real world to assist in identifying a user context. In particular, the machine learning component 98 uses well known unsupervised machine learning techniques to discover and update user contexts from past behavior in the virtual universe and the real world combined with supervised machine learning techniques to refine user context attributes and values based on user interactions with the enhanced virtual universe search tool 53.

Additional details of using unsupervised and supervised machine learning techniques in a search service are set forth in U.S. Pat. No. 6,701,311 entitled "Customer Self Service System for Resource Search and Selection"; U.S. Pat. No. 6,778,193 entitled "Customer Self Service Iconic Interface for Portal Entry and Search Specification"; U.S. Pat. No. 6,853,998 entitled "Customer Self Service Subsystem for Classifying User Contexts"; U.S. Pat. No. 6,643,639 entitled "Customer Self Service Subsystem for Adaptive Indexing of Resource Solutions and Resource Lookup"; U.S. Pat. No. 6,785,676 entitled "Customer Self Service Subsystem for Response Set Ordering and Annotation"; U.S. Pat. No. 6,693,651 entitled "Customer Self Service Iconic Interface for Resource Search Results Display and Selection"; and U.S. Pat. No. 6,873,990 entitled "Customer Self Service Subsystem for Context Cluster Discovery and Validation."

In this invention, the machine learning component 98 discovers and updates user contexts from past behavior in the virtual universe with unsupervised machine learning techniques in the following manner. As described previously, the enhanced virtual universe search tool 53 includes a scanning component 82 configured to scan a collection of avatar data describing attributes that are relevant to behavioral, search and information needs of the avatar (i.e. the user) making the query. Prior to the submission of a user's query, the enhanced virtual universe search tool 53 uses previously disclosed clustering mechanisms and a distance metric for associating closeness of the user interaction data. The machine learning component 98 clusters the avatar data according to the distance metric to determine new user contexts (example: senior citizen virtual universe beginner, young single, etc.) and associated attributes (age, religion; mobility) and values (young adult, middle age, senior citizen; Catholic, Jewish, Protestant; virtual universe expert, virtual universe competent, virtual universe challenged). As additional avatar data becomes available, machine learning component 98 updates the initially identified user contexts and associated attributes and values using processes previously disclosed in U.S. Pat. No. 6,873,990. These unsupervised machine learning techniques leverage the user interaction data of all avatars, not just the avatar performing the search, by enriching the data associated with the avatar performing the search with data associated with similar avatars as determined by clustering processes. This embodiment of the invention uses machine learning to benefit all avatars over time, not just the specific avatar doing the search.

In this invention, the machine learning component 98 uses supervised machine learning techniques in the following manner to refine user context attributes and values based on user interactions. In this embodiment of the invention, user selections in response to the presentation of query search results provide training data to inform the identification of user contexts and associated attributes and values referenced when a specific user performs a future query.

In operation, the machine learning component 98 would work in the following manner to discover and update user contexts. Prior to a user signing on, the machine learning component 98 performs a preprocessing step that comprises an automatic clustering process which uses unsupervised machine learning techniques to discover and update user contexts from past behavior of other users in the virtual universe and the real world. When the user logs in to the virtual universe, he or she is transparently assigned to one of the discovered user contexts. This can be done automatically and does not require user intervention. The user then enters a search query and results are returned that are in accordance with the discovered user context. The user can then explore promising resources from the resulting response set. In the mean time, interactions of the user with the enhanced virtual universe search tool 53 are captured to further refine their user context attributes and values for their next use of the tool. For example, this embodiment of the invention may have initially concluded that an avatar is best identified with the user context "senior citizen virtual universe beginner" (which includes attribute "mobility" and value "virtual universe challenged") but their responses to the search results from a query regarding "vacations" might all be associated with a different context such as "young single." That is, search results associated with relatively sedate senior citizen vacation locations in a virtual universe would not be selected by the avatar but those associated with high adventure, and difficult avatar mobility, might be preferred, even though they were given less prominence in the search results returned in response to the query. The enhanced virtual universe search tool 53 would then substitute a different user context ("young single") when this avatar performs their next search, or might make a more limited refinement by keeping the initial user context ("senior citizen virtual universe beginner") but changing the default value for the attribute "mobility" for this user to "virtual universe competent." In addition, the enhanced virtual universe search tool 53 via the machine learning component 98 can inform the identification of new user contexts and new attributes and values for existing user contexts for the benefit of all users within the virtual universe 12 via the aforementioned supervised machine learning techniques.

Although not expressly shown in FIG. 5, all of the components of the enhanced virtual universe search tool 53 are configured to interact with each other. The components that are shown as being interconnected are illustrated in that manner to convey the close interactions that exist between these components.

The following example illustrates how searches are made more effective by the enhanced virtual universe search tool 53 using both the scanning component 82 and the machine learning component 98 to automatically place the search in a user context that is based on inventory items and other automatically derived context measures from the virtual universe 12 and real life. In this example, a user decides to take a virtual vacation and plans to do a search for "warm water resorts." The avatar of the user is female and based on several earlier teleports to various virtual universe sites catering to senior citizens, the enhanced virtual universe search tool 53 assigns the user context "senior citizen" to the user and for the attribute "gender" assigns the value "female."

The user logs into the virtual universe and enters her query. The enhanced virtual universe search tool 53 has previously surveyed her avatar's inventory and noted a number of items related to cameras. For the attribute "importance of audit trail/capture memories" the value selected is "important" instead of alternatives such as "unimportant" for other avatars. This attribute-value pair will be used to inform the search by highlighting vacation resources with nearby available camera services. Similarly, the enhanced virtual universe search tool 53 has previously reviewed the avatar's motion control history and concluded that the user is relatively unskilled in flying and maneuvering her avatar in tight spaces. For the attribute "mobility" the enhanced virtual universe search tool 53 has associated the value "challenged." The "mobility-challenged" attribute-value pair will inform the search by highlighting vacation locations not requiring complex avatar motion control.

If useful, a user may turn off use of certain automatically derived contexts. For example, if the user was interested in exploring a virtual Hawaii before going to the real Hawaii, the user may wish to turn off contexts related to klutzy avatar motions, which would not have much value in this particular scenario, because such motions are not relevant to the real-life vacation.

Similarly, the enhanced virtual universe search tool 53 has previously applied analytics to the user's on-line book shopping history and their tagging behavior in the real world to conclude that the user is interested in the history of indigenous people in the Americas. In addition, the enhanced virtual universe search tool 53 has reviewed the number and nature of the user's teleports (log) in the virtual universe and noted a number of trips to historical sites. As a result, for the attribute "interests and passions", the enhanced virtual universe search tool 53 has associated the value "history."

As the user explores promising resources from the resulting response set, the user's interactions with the enhanced virtual universe search tool 53 are captured to further refine their user context attributes and values for their next use of the tool. For example, if the user selects only singles resorts, the enhanced virtual universe search tool 53 assigns to the attribute "marital status" the value "single" and adds to the attribute "interests and passions" a second value—"single men." Subsequent searches will highlight resources frequently selected by other users assigned to the user context "senior citizen" with similar attribute-value pairs.

In another embodiment of this invention, the enhanced virtual universe search tool 53 is used as a service to charge fees for each search that is run for a query. In this embodiment, the provider of the virtual universe or a third party service provider could offer this user context search as a service by performing the functionalities described herein on a subscription and/or fee basis. In this case, the provider of the virtual universe or the third party service provider can create, deploy, maintain, support, etc., the enhanced virtual universe search tool 53 that performs the processes described in the invention. In return, the virtual universe or the third party service provider can receive payment from the virtual universe residents via the universe economy management component 70 and the commercial transaction management component 72.

In still another embodiment, the methodologies disclosed herein can be used within a computer system to generate user context searches. In this case, the enhanced virtual universe search tool 53 can be provided and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 6:
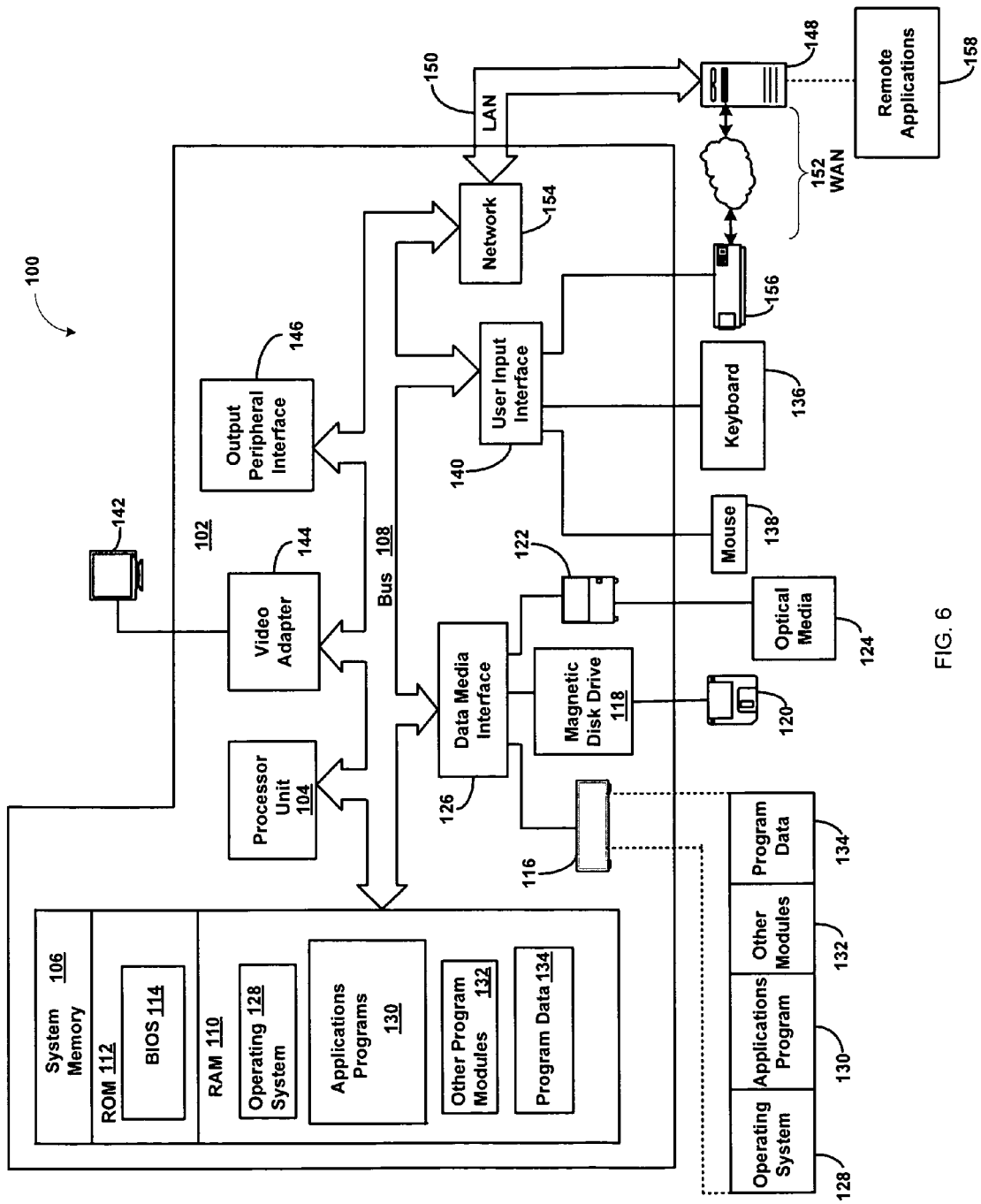
FIG. 6 shows a schematic of an exemplary computing environment in which elements of the networking environment shown in FIG. 1 may operate.

FIG. 6 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 6.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 6, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 6, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 (e.g., the enhanced virtual universe search tool 53) other program modules 132, and program data 134 or some combination thereof, may include an implementation of the networking environment 10 of FIG. 1 including the server array 14, the virtual universe client 24 and the enhanced virtual universe search tool 53.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 6 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for applying user context to searches in a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method, performed on a computer system, for performing a search for a resource in a virtual universe using user context, the method comprising:

using the computer system to perform the following:

receiving a query from an avatar that is online in the virtual universe;

scanning a collection of avatar data describing attributes that are relevant to behavioral, search and informational needs of the avatar, wherein the scanning of a collection of avatar data comprises scanning all of the following:

inventory items belonging to the avatar, teleportation history of the avatar, motion history of the avatar and social tagging behavior exhibited by the user of the avatar in the real world;

using the scanned collection of avatar data to determine a user context for the avatar from at least one of past behavior in the virtual universe or past behavior exhibited by the user of the avatar in the real world, wherein the determining of a user context for the avatar comprises using a plurality of matching techniques to assign a mutually exclusive category designation from a list of mutually exclusive category designations applicable to each scanned collection of avatar data including the inventory items belonging to the avatar, the teleportation history of the avatar, the motion history of the avatar and the social tagging behavior exhibited by the user of the avatar in the real world, to specific avatar data obtained therefrom and comparing the specific avatar data with criteria associated with the assigned category designation to identify a value with an attribute that provides user context of the avatar, wherein the determining of a user context for the avatar further comprises using machine learning techniques, wherein the machine learning techniques comprise an unsupervised machine learning technique that discovers and updates user contexts from the past behavior in the virtual universe and the real world and a supervised machine learning technique that refines user context attributes and values based on user interactions with a virtual universe search tool, wherein the unsupervised machine learning technique clusters avatar data according to a distance metric to determine user contexts, associated attributes and values for the attributes and updates the user contexts, associated attributes and values as more avatar data becomes available, wherein the unsupervised machine learning technique leverages user interaction data of all avatars in the virtual universe by enriching data associated with the avatar performing the search with data associated with similar avatars as determined by clustering avatar data; and performing a resource search for the query in accordance with one of the user contexts determined from the scanned collection of avatar data.

2. The method according to claim 1, wherein the performing of the resource search comprises reformulating the query to take into account other user contexts identified for the avatar.

3. The method according to claim 1, further comprising modifying the determined user contexts based on additional queries submitted by the avatar.

4. The method according to claim 1, wherein the supervised machine learning technique uses avatar selections in response to a presentation of query search results as training data to identify further user contexts, associated attributes and values for use in future queries made from an avatar.

5. A computer system for automatically performing a search for a resource in a virtual universe using user context, comprising:

at least one processing unit;

memory operably associated with the at least one processing unit; and an enhanced virtual universe search tool storable in memory and executable by the at least one processing unit, the tool comprising:

a receiving component configured to receive a query from an avatar that is online in the virtual universe;

a scanning component configured to scan a collection of avatar data describing attributes that are relevant to behavioral, search and informational needs of the avatar, wherein the scanning component comprises an inventory biased search component configured to search inventory items belonging to the avatar, a teleport biased search component configured to search teleportation history of the avatar, an avatar motion biased search component configured to search motion history of the avatar and a real life social tagging biased search component configured to search social tagging behavior exhibited by the user of the avatar in the real world, wherein the scan of the collection of avatar data comprises scanning all of the following: inventory items belonging to the avatar, teleportation history of the avatar, motion history of the avatar and social tagging behavior exhibited by the user of the avatar in the real world;

a user context identifying component configured to identify a user context from the collection of avatar data, the user context identifying component identifying the user context from the collection of avatar data by using a plurality of matching techniques to assign a mutually exclusive category designation from a list of mutually exclusive category designations applicable to each scanned collection of avatar data including the inventory items belonging to the avatar, the teleportation history of the avatar, the motion history of the avatar and the social tagging behavior exhibited by the user of the avatar in the real world, to specific avatar data obtained therefrom and comparing the specific avatar data with criteria associated with the assigned category designation to identify a value with an attribute that provides the user context of the avatar;
a machine learning component configured to determine further user contexts for the avatar from at least one of past behavior in the virtual universe or past behavior exhibited by the user of the avatar in the real world, wherein the machine learning component utilizes an unsupervised machine learning technique that discovers and updates user contexts from the past behavior in the virtual universe and the real world and a supervised machine learning technique that refines user context attributes and values based on user interactions with a virtual universe search tool, wherein the unsupervised machine learning technique clusters avatar data according to a distance metric to determine user contexts, associated attributes and values for the attributes and updates the user contexts, associated attributes and values as more avatar data becomes available, wherein the unsupervised machine learning technique leverages user interaction data of all avatars in the virtual universe by enriching data associated with the avatar performing the search with data associated with similar avatars as determined by clustering avatar data, wherein the supervised machine learning technique uses avatar selections in response to a presentation of query search results as training data to identify further user contexts, associated attributes and values for use in future queries made from an avatar; and
a resource search component configured to return search results for the query that are in accordance with at least one of the user contexts determined from the scanned collection of avatar data.

6. The computer system according to claim 5, wherein the resource search component of the enhanced virtual universe search tool is configured to reformulate the query to take into account other user contexts identified for the avatar.

7. The computer system according to claim 5, wherein the machine learning component of the enhanced virtual universe search tool is configured to modify the determined user contexts based on additional queries submitted by the avatar.

8. A non-transitory computer-readable medium storing computer instructions, which when executed by a processor, enables a computer system to perform a search for a resource in a virtual universe using user context, the computer instructions comprising:
receiving a query from an avatar that is online in the virtual universe;
scanning a collection of avatar data describing attributes that are relevant to behavioral, search and informational needs of the avatar, wherein the scanning of a collection of avatar data comprises instructions for scanning all of the following: inventory items belonging to the avatar, teleportation history of the avatar, motion history of the avatar and social tagging behavior exhibited by the user of the avatar in the real world;
using the scanned collection of avatar data to determine a user context for the avatar from at least one of past behavior in the virtual universe or past behavior exhibited by the user of the avatar in the real world, wherein the determining of a user context for the avatar comprises using a plurality of matching techniques to assign a mutually exclusive category designation from a list of mutually exclusive category designations applicable to each scanned collection of avatar data including the inventory items belonging to the avatar, the teleportation history of the avatar, the motion history of the avatar and the social tagging behavior exhibited by the user of the avatar in the real world, to specific avatar data obtained therefrom and comparing the specific avatar data with criteria associated with the assigned category designation to identify a value with an attribute that provides user context of the avatar;
using machine learning techniques with the scanned collection of avatar data to determine further user contexts for the avatar from at least one of past behavior in the virtual universe or past behavior exhibited by the user of the avatar in the real world, wherein the machine learning techniques comprise an unsupervised machine learning technique that discovers and updates user contexts from the past behavior in the virtual universe and the real world and a supervised machine learning technique that refines user context attributes and values based on user interactions with a virtual universe search tool, wherein the unsupervised machine learning technique clusters avatar data according to a distance metric to determine user contexts, associated attributes and values for the attributes and updates the user contexts, associated attributes and values as more avatar data becomes available, wherein the unsupervised machine learning technique leverages user interaction data of all avatars in the virtual universe by enriching data associated with the avatar performing the search with data associated with similar avatars as determined by clustering avatar data, and wherein the supervised machine learning technique uses avatar selections in response to a presentation of query search results as training data to identify further user contexts, associated attributes and values for use in future queries made from an avatar; and
performing a resource search for the query in accordance with at least one of the user contexts determined from the scanned collection of avatar data.

9. The non-transitory computer-readable medium according to claim 8, wherein the performing of the resource search comprises instructions for reformulating the query to take into account other user contexts identified for the avatar.

10. The non-transitory computer-readable medium according to claim 8, further comprising instructions for modifying the determined user contexts based on additional queries submitted by the avatar.

11. A method for providing an enhanced virtual universe search tool as a service within a virtual universe for facilitating user context type searches for resources within the virtual universe, comprising:
deploying the enhanced virtual universe search tool in a computer system as a service that is in communication with the virtual universe, wherein the enhanced virtual universe search tool is operable to:
receive a query from an avatar that is online in the virtual universe;
scan a collection of avatar data describing attributes that are relevant to behavioral, search and informational needs of the avatar, wherein the scan of a collection of avatar data comprises scanning all of the following: inventory items belonging to the avatar, teleportation history of the avatar, motion history of the avatar and social tagging behavior exhibited by the user of the avatar in the real world;
use the scanned collection of avatar data to determine a user context for the avatar from at least one of past behavior in the virtual universe or past behavior exhibited by the user of the avatar in the real world, wherein the determining of a user context for the avatar comprises using a plurality of matching techniques to assign a mutually exclusive category designation from a list of mutually exclusive category designations applicable to each scanned collection of avatar data including the inventory items belonging to the avatar, the teleportation history of the avatar, the motion history of the avatar and the social tagging behavior exhibited by the user of the avatar in the real world, to specific avatar data obtained therefrom and comparing the specific avatar data with criteria associated with the assigned category designation to identify a value with an attribute that provides user context of the avatar;

use the scanned collection of avatar data to determine further user contexts for the avatar from at least one of past behavior in the virtual universe or past behavior exhibited by the user of the avatar in the real world, wherein the determining of further user contexts for the avatar comprises using machine learning techniques, wherein the machine learning techniques comprise an unsupervised machine learning technique that discovers and updates user contexts from the past behavior in the virtual universe and the real world and a supervised machine learning technique that refines user context attributes and values based on user interactions with a virtual universe search tool, wherein the unsupervised machine learning technique clusters avatar data according to a distance metric to determine user contexts, associated attributes and values for the attributes and updates the user contexts, associated attributes and values as more avatar data becomes available, wherein the unsupervised machine learning technique leverages user interaction data of all avatars in the virtual universe by enriching data associated with the avatar performing the search with data associated with similar avatars as determined by clustering avatar data; and perform a resource search for the query in accordance with at least one of the user contexts determined from the scanned collection of avatar data.

12. The method according to claim 11, wherein the enhanced virtual universe search tool is further operable to charge a search fee to a virtual universe service provider of the virtual universe or to the avatar making the query.

13. A method for deploying an enhanced virtual universe search tool for use in a computer system that automatically performs a search for a resource in a virtual universe using user context, comprising:

providing a computer infrastructure operable to:

receive a query from an avatar that is online in the virtual universe;

scan a collection of avatar data describing attributes that are relevant to behavioral, search and informational needs of the avatar, wherein the scan of a collection of avatar data comprises scanning all of the following: inventory items belonging to the avatar, teleportation history of the avatar, motion history of the avatar and social tagging behavior exhibited by the user of the avatar in the real world;

use the scanned collection of avatar data to determine a user context for the avatar from at least one of past behavior in the virtual universe or past behavior exhibited by the user of the avatar in the real world, wherein the determining of a user context for the avatar comprises using a plurality of matching techniques to assign a mutually exclusive category designation from a list of mutually exclusive category designations applicable to each scanned collection of avatar data including the inventory items belonging to the avatar, the teleportation history of the avatar, the motion history of the avatar and the social tagging behavior exhibited by the user of the avatar in the real world, to specific avatar data obtained therefrom and comparing the specific avatar data with criteria associated with the assigned category designation to identify a value with an attribute that provides user context of the avatar;

use the scanned collection of avatar data to determine further user contexts for the avatar from at least one of past behavior in the virtual universe or past behavior exhibited by the user of the avatar in the real world, wherein the determining of further user contexts for the avatar comprises using machine learning techniques, wherein the machine learning techniques comprise an unsupervised machine learning technique that discovers and updates user contexts from the past behavior in the virtual universe and the real world and a supervised machine learning technique that refines user context attributes and values based on user interactions with a virtual universe search tool, wherein the unsupervised machine learning technique clusters avatar data according to a distance metric to determine user contexts, associated attributes and values for the attributes and updates the user contexts, associated attributes and values as more avatar data becomes available, wherein the unsupervised machine learning technique leverages user interaction data of all avatars in the virtual universe by enriching data associated with the avatar performing the search with data associated with similar avatars as determined by clustering avatar data; and perform a resource search for the query in accordance with at least one of the user contexts determined from the scanned collection of avatar data.

* * * * *